United States Patent [19]

Valdez et al.

[11] Patent Number: 5,099,983
[45] Date of Patent: Mar. 31, 1992

[54] PORTABLE AUGER SYSTEM APPARATUS AND METHOD FOR DEPOSITING GYPSUM INTO AN IRRIGATION DITCH

[76] Inventors: Arthur L. Valdez; Elva R. Valdez, both of 8611 W. Verde La., Phoenix, Ariz. 85037

[21] Appl. No.: 654,885

[22] Filed: Feb. 13, 1991

[51] Int. Cl.⁵ .................................................. B65G 65/22
[52] U.S. Cl. ................................... 198/507; 198/518; 198/519; 198/661; 198/675; 198/670; 414/319; 414/322
[58] Field of Search ............... 198/507, 518, 519, 661, 198/675, 670; 414/309, 310, 319, 322, 326

[56] References Cited

U.S. PATENT DOCUMENTS

| | | |
|---|---|---|
| 1,852,525 | 4/1932 | Kemmer . |
| 2,507,245 | 5/1950 | Dady . |
| 2,605,885 | 8/1952 | Baldwin . |
| 2,664,189 | 12/1953 | Hager . |
| 2,765,899 | 10/1956 | Ballard . |
| 2,858,011 | 10/1958 | Wahl . |
| 3,055,550 | 9/1962 | Smith et al. . |
| 3,105,586 | 10/1963 | Carew et al. . |
| 3,155,288 | 11/1964 | Landgraf . |
| 3,298,543 | 1/1967 | Laidig ............................. 414/307 |
| 3,338,434 | 8/1967 | Kolze ............................. 414/307 |
| 3,381,802 | 5/1968 | Levanney et al. . |
| 3,391,778 | 7/1968 | Lasiter . |
| 3,539,058 | 11/1970 | Ferris ............................. 414/307 |
| 3,648,860 | 3/1972 | Wennberg ....................... 414/310 |
| 3,707,224 | 12/1972 | Rastoin ........................... 198/676 X |
| 4,015,734 | 4/1977 | Laidig ............................. 414/310 |
| 4,103,788 | 8/1978 | Sutton ............................ 414/309 |
| 4,183,702 | 1/1980 | Bonnel . |
| 4,386,695 | 6/1983 | Olson . |
| 4,391,561 | 7/1983 | Smith et al. . |
| 4,534,693 | 8/1985 | Weaver .......................... 414/310 X |
| 4,619,577 | 10/1986 | Swanson . |
| 4,669,941 | 6/1987 | West et al. ..................... 198/518 X |
| 4,708,567 | 11/1987 | Greeb ............................. 414/310 |
| 4,820,053 | 4/1989 | Rivers . |

Primary Examiner—D. Glenn Dayoan
Attorney, Agent, or Firm—Victor Flores

[57] ABSTRACT

A portable sweep auger apparatus and method for controllably transferring predetermined continuous amounts of granular and powdered gypsum from a pile of gypsum to an irrigation ditch. The apparatus includes a base member, a driver member and an auger assembly member mechanically coupled to the driver member. The driver member and the auger assembly member are pivotally coupled to the base member to effect forward travel that depletes the gypsum pile. A first level of control is effected by a fixed auger design that coact with the driver member for regulating and delivering predetermined amounts of the gypsum material. A second level of control is effected by a slip clutch wheel coacting with the rotating auger shaft for controlling forward movement of the entire auger assembly towards and against the pile of gypsum material until the material has been depleted. A track that compensates for unleveled terrain is provided for guiding the slip clutch wheel.

9 Claims, 2 Drawing Sheets

PORTABLE AUGER SYSTEM APPARATUS AND METHOD FOR DEPOSITING GYPSUM INTO AN IRRIGATION DITCH

FIELD OF THE INVENTION

This invention relates to sweep augers. More particularly, the present invention relates to sweep augers having capability of controlling the rate of deposit of fertilizer material, such as gypsum. Even more particularly, the present invention relates to portable sweep augers having means for controlling the rate of material deposit, means for controlling forward drive and guidance means for maneuvering in outdoor agricultural terrain.

DESCRIPTION OF THE PRIOR ART

While augers are known for aiding the transfer of material from one location to another, the art of transferring gypsum via irrigation water has not fully capitalized on the use of augers to transfer the gypsum in controlled amounts to effect proper dissolution in the flowing irrigation water. Methods known to applicant include the introduction of large, slow dissolving chunks of gypsum directly into an irrigation ditch to effect the introduction of the gypsum into the soil over long term flood irrigation. Other methods include manual scooping into a ditch, predetermined amounts of gypsum from a nearby bin containing gypsum or from a ground level pile of gypsum. This method is highly dependent on the timely execution of the scooping task, and more so than not, results in a very noticeable result in the plants whose soil failed to get any gypsum due to a miss in the scooping schedule.

Known patented systems for dissolving gypsum include U.S. Pat. No. 4,820,053 teaching a tank system for vigorously agitating granular gypsum into a slurry for introduction into the irrigation water. The system no doubt functions as claimed but lack simplicity of design for wide portable usage.

The amount of gypsum required in a given situation depends upon the flow rate of the irrigation water, typically expressed in gallons per minutes and the solubility of the gypsum, which is dependent on the particle size of the gypsum, i.e. the smaller the particle size the greater the solubility. U.S. Pat. No. 4,820,053 provides a tutorial as to how various solubility rates of gypsum affect soil moisture penetration. Gypsum suppliers typically provide a user with data concerning the amounts of gypsum that is needed based on the user's irrigation water and associated gallon per minute information factoring the desired moisture penetration and the soil exposure to the treated water. The user must then determine the means of delivering the requisite amounts of the gypsum to the flowing water.

Sweep augers known are not concerned with controlling the transferred amount of material in a recipe sense. These sweep auger designs do not limit the feeding of the material to the auger shaft, rather they maximize the material feeding to complete the transfer task as soon as possible. Exemplary of the sweep auger design include U.S. Pat. Nos. 4,386,695 and 4,619,577. The '577 patent teachings include the use of a distal end drive wheel that lacks control upon encountering loading impediments. Other auger and conveyor methods and apparatus can be found in U.S. Pat. Nos. 1,852,525, 2,507,245, 2,605,885, 2,664,189, 2,765,899, 2,858,011, 3,055,550, 3,105,586, 3,155,288, 3,381,802, 3,391,778, 4,183,702, and 4,391,561. Of general interest is U.S. Pat. No. 2,507,245 teaching auger shaft's flight design considerations to regulate material delivery. Thus, while the prior art has taught sweep augers, the prior art has failed to provide sweep auger structure that is adapted to the outdoor agricultural need of transferring material in predetermined quantities from one location to another.

Therefore, a need is seen to exist for a portable sweep auger apparatus for controllably transferring predetermined continuous amounts of granular and powdered material from a pile of said material for use at another location.

More particularly, a need is seen to exist for a portable sweep auger apparatus and method for controllably transferring predetermined continuous amounts of granular and powdered gypsum from a pile of gypsum to an irrigation ditch.

SUMMARY OF THE INVENTION

Accordingly, the primary object of the present invention is to provide a portable sweep auger apparatus and method for controllably transferring predetermined continuous amounts of granular and powdered gypsum from a pile of gypsum to an irrigation ditch. The foregoing object is accomplished by providing an apparatus comprising a base member; a driver member; and an auger assembly member mechanically coupled to said driver member, said driver member and said auger assembly member being pivotally coupled to said base member, said auger assembly having a first control means rotatably coupled to and coacting with said driver member for regulating and delivering said predetermined amounts of said material, and said auger assembly also having a second control means rotatably coupled to and coacting with said first control means for controlling forward movement of said auger assembly towards and against said pile of material until said material has been depleted.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating but one of the various ways in which the invention may be practiced.

DESCRIPTION OF THE PREFERRED EMBODIMENT

Figure 1:
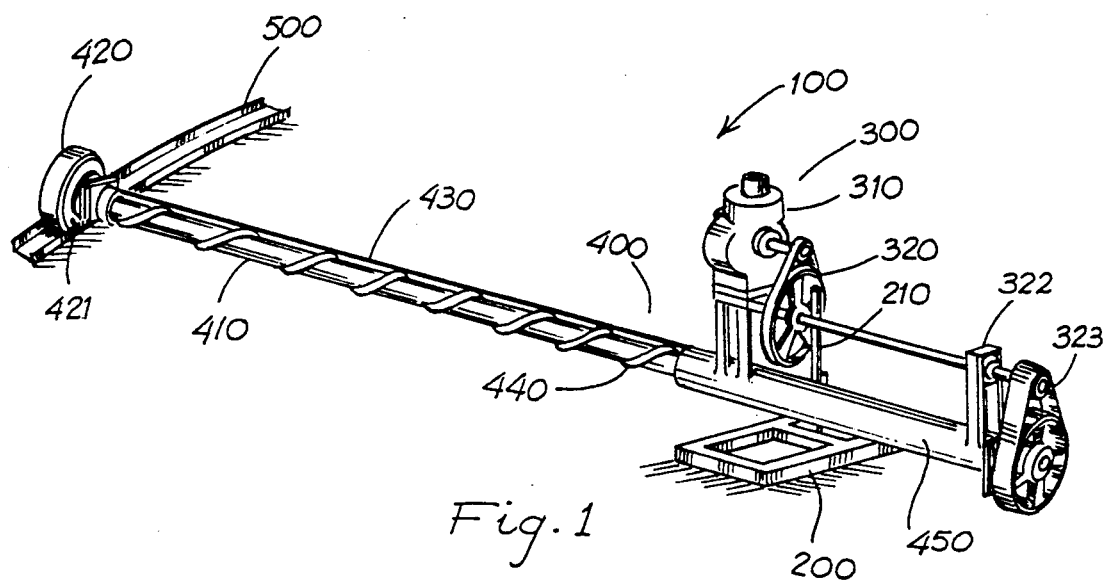
FIG. 1 is a perspective view of the present invention illustrating in assembly the sweep auger member positioned with the terrain compensation means.
Figure 3:
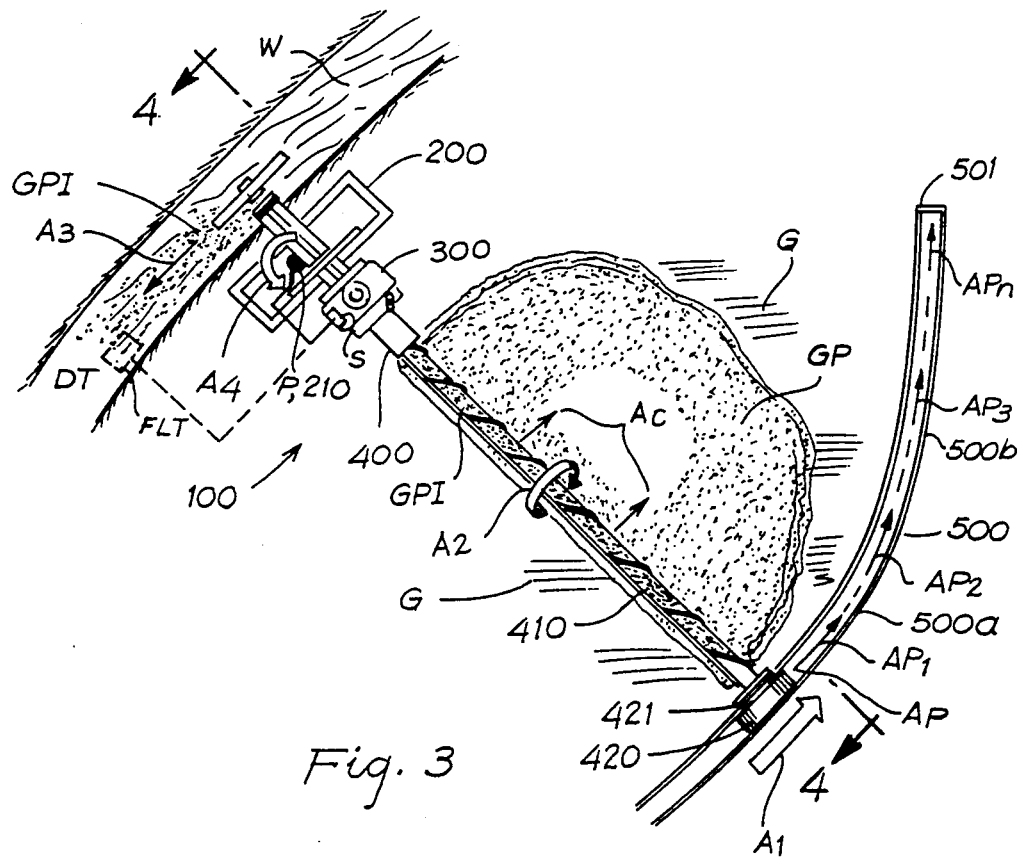
FIG. 3 is an overhead view of a typical outdoor agricultural field arrangement whereby the present invention is positioned to transfer gypsum from a pile to a nearby irrigation ditch.

Referring now to FIGS. 1 and 3 where the present invention is illustrated and comprises a portable sweep auger apparatus 100 for controllably transferring, to an irrigation ditch DT, predetermined continuous amounts of granular and powdered gypsum GPI from a pile of gypsum GP, previously dumped on ground G. Apparatus 100 comprising a base member 200, a driver 300, an auger assembly member 400 and a terrain surface compensation member 500. Auger assembly member 400 being mechanically coupled to driver member 300, said driver member 300, said auger assembly member 400 being pivotally coupled to said base member 200 as indicated by pivot arrow A4, while auger assembly 400 is in surface contact with terrain surface compensation 500. Auger assembly 400 comprising a first control means that is interdependent on two aspects of design, namely design of a fixed auger flight arrangement and a variable drive control means that factors the auger flight's material handling capability at a particular drive speed. The fixed mechanical auger flight control means includes auger shaft 410 and helical rod 440 rotatably coupled to variable drive control means, which by example, may be provided in the form of a gasoline engine 310 with an rpm gauge and throttle control (not shown). The drive transfer coupling arrangement includes a first belt drive 320, a first bearing support 321, second bearing support 322 and second belt drive 323 coupled to auger shaft 410 to coact with said means 310 for regulating and delivering said predetermined amounts GPI of said gypsum. Sweep auger apparatus 100 also includes a second control means for controllably driving apparatus 400 towards pile GP. This second control means includes a slip clutch wheel (420,421) member of assembly 400 and a detachable terrain surface compensation means 500.

Figure 2:
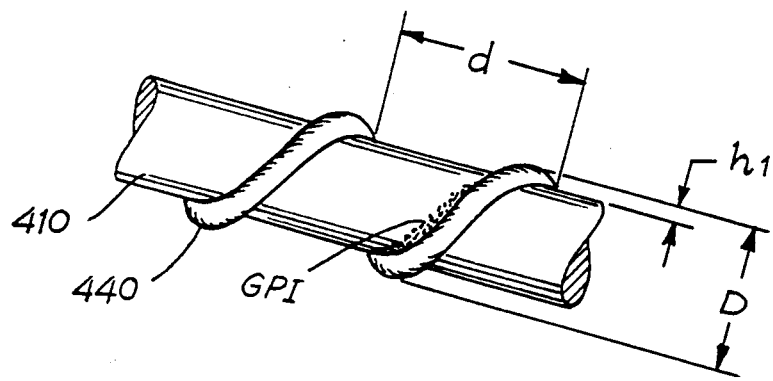
FIG. 2 is an enlarged perspective view of a fragment of the auger shaft and helical arranged rod utilized by the present invention to regulate the amount of gypsum to be delivered.
Figure 4:
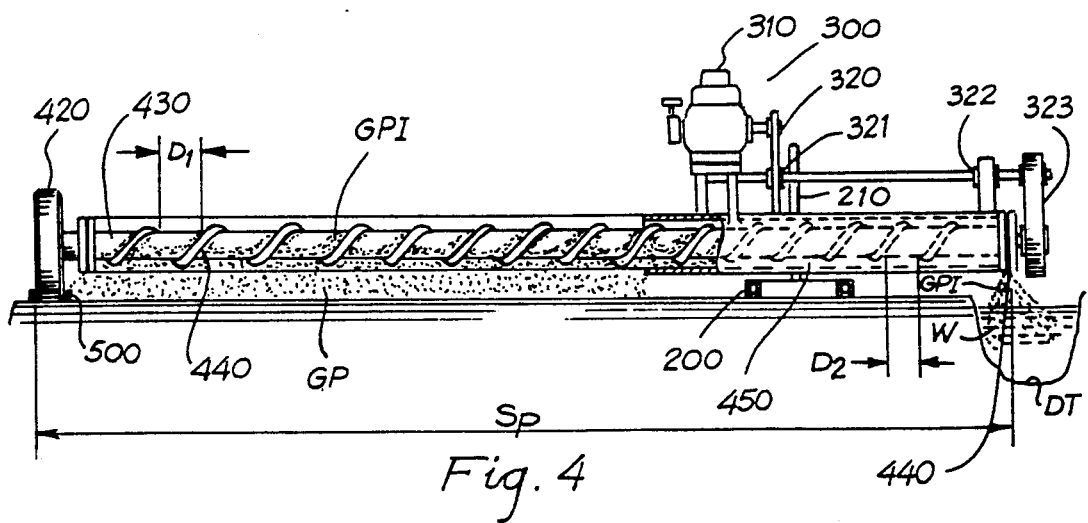
FIG. 4 is a sectional view taken along line 4—4 in FIG. 4 illustrating the decreasing flight pitch arrangement of the auger shaft that is used to control the amount of gypsum being delivered to the nearby ditch.

FIG. 2 shows an enlarged view of a portion of auger shaft 410 with helical rod 440 forming a plurality of flights having a pitch d. Auger shaft rotation A2, see FIG. 3, and rod diameter h1 factor in controlling the amount of gypsum particles GPI that are deposited in water W. Applicant has determined that a ⅜ inch helically attached rod will adequately pick up granular gypsum, 100 mesh gypsum, without unduly loading down motor means 310, yet deliver manageable quantities of Gypsum GPI. Further, applicant has achieved manageable feed control over an auger span Sp of 21 feet (see FIG. 4), by using a rod of diameter h1 equal ⅜ inch to obtain a constant flight diameter D (approximately 3.0 inches), and a pitch d that decreasingly varies from d1 equal 6.0 inches at the beginning of the feed section to a lesser d2 equal 2 inches at the last flight of delivery section 450 (see FIG. 4). The low profile of rod 440 is key in delivering small amounts of gypsum, e.g. 5 pounds per minute, however, since the auger mechanical design is fixed for a given sweep auger apparatus, the ultimate amount of gypsum delivered depends on the revolution per minute that auger 410 must turn consistent with the fixed design of the auger, in combination with forward movement effected by the second control means.

In operation, auger 100 is set up proximate a ditch Dt having water W flowing, as indicated by arrow A3, and a pile of gypsum GP previously dumped or subsequently dumped. Although not shown, the portability of apparatus 100 is easily effected by placing wheels beneath base 200 and a tow bar at auger end proximate wheel 420 to locate the apparatus 100 at another similar location. The length of apparatus 100, determined partly by span Sp, is adequate to incorporate the diameter of pile GP. The drive wheel 420 is positioned on the outer fringes of pile Gp on terrain compensation track means 500 to assure a smooth surface of forward movement. The use of means 500 is optional depending on the level of the ground surface being utilized. To begin operation, a user calibrates the sweep auger's capability factoring the density of the granular material, the amount of the material that the particular fixed auger design will deliver at a given speed. The data for the particular sweep auger apparatus can be reused, if appropriate, at other setup locations of the auger. Once the calibration has been established to deliver a predetermined amount of gypsum GPI into water W, the continuous feeding, as indicated by arrows Ac, must be maintained.

The second control means functions to maintain a continuous feed until the pile of gypsum has been depleted. Assuming that the feed rate and forward travel were synchronized, then forward movement arrow A1 associated with slip clutch wheel 420, 421 would be continuous, i.e. a tensioning means (not shown), associated with slip clutch means 421, is appropriately tensioned to maintain drive wheel 420 in a coupled relationship with rotating auger shaft 410 such that continuous forward travel A1 and continuous feeding, as indicated by arrow Ac, are effected. However, since the material flow from the pile is not constant, falling, or being knocked down by auxiliary rotating shaft (not shown), and being caught by auger backboard 430, the forward travel contains intermittent pauses, effected by clutch means 421 and the associated tensioning means to allow the auger feeding to continue without being further bogged down. The pauses are effected by clutch means 421 by controlling the amount of tensioning between drive wheel 420 and the rotating auger shaft 410 such that slippage, or uncoupling, occurs between drive wheel 420 and the rotating auger shaft 410 upon encountering material impediment to forward motion that requires greater amount of tensioning to maintain wheel 420 and shaft 410 in a coupled relation. If the amount of tensioning were such that a coupled relation were to be maintained between wheel 420 and shaft 410 without considering the loading impediment of the bulk material, then, wheel 420 would continue to rotate or spin in-place without any forward motion until the pile was depleted sufficiently to allow wheel 420 to regain traction. Clutch means 421 and associated tensioning means facilitate either a coupled or uncoupled relationship between wheel 420 and shaft 410 that enables uniform feeding and controlled forward motion of auger assembly member 400. The pauses are indicated by arrows Ap, Ap(1-n), along track 500 and members 500a, 500b, until reaching stop 501.

The apparatus can be stopped upon depletion of pile Gp by slip clutch means 421 upon reaching stop 501, or by a switch S that shuts off engine means 310 at a selected point P in the pivot about shaft 210. Further, the engine can be shut off by a float activated mechanism FLT in irrigation ditch DT coupled to engine 310, see generally FIG. 3.

Therefore, while the present invention has been shown and described herein in what is believed to be the most practical and preferred embodiments, it is recognized that departures can be made therefrom within the

I claim:

1. A portable sweep auger apparatus for controllably transferring predetermined continuous amounts of granular and powdered gypsum from a pile of gypsum to an irrigation ditch, said apparatus comprising:
   a base member;
   a variable speed driver member; and
   an auger assembly member mechanically coupled to said driver member,
      said driver member and said auger assembly member being pivotally coupled to said base member,
      said auger assembly having a first control means rotatably coupled to and coacting with said driver member for regulating and delivering said predetermined amount of said gypsum, said first control means comprising a fixed mechanical control means and a variable drive control means, and
      said auger assembly also having a second control means rotatably coupled to and coacting with said first control means for controlling forward movement of said auger assembly,
   said fixed mechanical control means comprises an auger shaft having a helical rod member arranged along said auger shaft forming a plurality of flights, said plurality of flights having a constant diameter and a uniformly decreasing flight pitch arrangement commencing at an initial feed section of said auger shaft, and
   said variable drive control means comprises a predetermined set of drive speed settings for operating said driver member, each drive speed setting of said set of drive speed settings corresponding to a predetermined amount of said gypsum to be transferred to said irrigation ditch, said predetermined amount of gypsum being determined by a dynamic relationship of a particular speed setting for rotating said auger shaft, said diameter of said flights, and said pitch arrangement, said driver member comprises a shut-off means for stopping operation of said apparatus upon depleting said pile of gypsum.

2. A portable sweep auger apparatus as recited in claim 1, wherein said second control means comprises:
   a wheel having a slip clutch and an associated tensioning means, said tensioning means being tensioned for disengaging said wheel from said first control means according to loading impediments encountered during transferring of said gypsum; and
   said apparatus further comprising a terrain compensation means for providing smooth surface contact with said wheel and eliminating terrain related forward movement stoppage, said terrain compensation means being suitably sized for arrangement about a fringe of said pile of gypsum.

3. A portable sweep auger apparatus for controllably transferring predetermined continuous amounts of granular and powdered gypsum from a pile of gypsum to an irrigation ditch, said apparatus comprising:
   a base member;
   a variable speed driver member; and
   an auger assembly member mechanically coupled to said driver member,
      said driver member and said auger assembly member being pivotally coupled to said base member,
      said auger assembly having a first control means rotatably coupled to and coacting with said driver member for regulating and delivering said predetermined amount of said gypsum, said first control means comprising a fixed mechanical control means and a variable drive control means, and
      said auger assembly also having a second control means rotatably coupled to and coacting with said first control means for controlling forward movement of said auger assembly, said second control means comprising a wheel having a slip clutch and an associated tensioning means, said tensioning means being tensioned for disengaging said wheel from said first control means according to loading impediments encountered during transferring of said gypsum.

4. A portable sweep auger apparatus as recited in claim 3, wherein:
   said fixed mechanical control means comprises an auger shaft having a helical rod member arranged along said auger shaft forming a plurality of flights, said plurality of flights having a constant diameter and a uniformly decreasing flight pitch arrangement commencing at an initial feed section of said auger shaft;
   said variable drive control means comprises a predetermined set of drive speed settings for operating said driver member, each drive speed setting of said set of drive speed settings corresponding to a predetermined amount of said gypsum to be transferred to said irrigation ditch, said predetermined amount of gypsum being determined by a dynamic relationship of a particular speed setting for rotating said auger shaft, said diameter of said flights, and said pitch arrangement; and
   said second control means further comprises a terrain compensation means for providing smooth surface contact with said wheel and eliminating terrain related forward movement stoppage.

5. A portable sweep auger apparatus for controllably transferring predetermined continuous amounts of granular and powdered gypsum from a pile of gypsum to an irrigation ditch, said apparatus comprising:
   a base member;
   a variable speed driver member;
   an auger assembly member mechanically coupled to said driver member, said driver member and said auger assembly member being pivotally coupled to said base member,
      said auger assembly having a first control means rotatably coupled to and coacting with said driver member for regulating and delivering said predetermined amount of said gypsum, said first control means comprising a fixed mechanical control means and a variable drive control means; and
      said auger assembly also having a second control means rotatably coupled to and coacting with said first control means for controlling forward movement of said auger assembly, said second control means comprises a terrain compensation means for providing a smooth surface contact that eliminates terrain related forward movement stoppage and a wheel having a slip clutch and an associated tensioning means, said tensioning means being tensioned for disengaging said wheel from said first control means according to loading impediments encountered during transferring of said gypsum, said wheel being guided by said terrain compensation means.

6. A portable sweep auger apparatus as recited in claim 5, wherein:
said fixed mechanical control means comprises an auger shaft having a helical rod member arranged along said auger shaft forming a plurality of flights, said plurality of flights having a constant diameter and a uniformly decreasing flight pitch arrangement commencing at an initial feed section of said auger shaft; and
said variable drive control means comprises a predetermined set of drive speed settings for operating said driver member, each drive speed setting of said set of drive speed settings corresponding to a predetermined amount of said gypsum to be transferred to said irrigation ditch, said predetermined amount of gypsum being determined by a dynamic relationship of a particular speed setting for rotating said auger shaft, said diameter of said flights, and said pitch arrangement.

7. A method of transferring predetermined continuous amounts of granular and powdered gypsum from a pile of gypsum to an irrigation ditch, said method comprising the steps of:
(a) providing a portable sweep auger apparatus comprising:
a base member;
a variable speed driver member; and
an auger assembly member mechaniclly coupled to said driver member,
said driver member and said auger assembly member being pivotally coupled to said base member,
said auger assembly having a first control means rotatably coupled to and coacting with said driver member for regulating and delivering said predetermined amount of said gypsum, said first control means comprising a fixed mechanical control means and a variable drive control means, and
said auger assembly also having a second control means rotatably coupled to and coacting with said first control means for controlling forward movement of said auger assembly;
(b) providing a pile of gypsum along a side of a flowing irrigation ditch;
(c) providing operational data and material transfer specification for said sweep auger apparatus comprising drive member speed and corresponding material transfer amounts associated with said variable drive control means and said fixed mechanical control means;
(d) positioning said portable sweep auger apparatus proximate said pile of gypsum such that said auger assembly has an outlet end positioned for depositing gypsum into said flowing irrigation ditch, a loading auger section positioned proximate said pile of gypsum for loading controlled amounts of gypsum, and said second control means positioned at a fringe of said pile of gysum;
(e) operating said sweep auger apparatus according to selected operational information provided in step (c); and (f) transferring gypsum into said irrigation ditch.

8. A method of transferring predetermined continuous amounts of granular and powdered gypsum as recited in claim 7, wherein:
said step (a) further comprises:
said fixed mechanical control means comprising an auger shaft having a helical rod member arranged along said auger shaft forming a plurality of flights, said plurality of flights having a constant diameter and a uniformly decreasing flight pitch arrangement commencing at an initial feed section of said auger shaft;
said variable drive control means comprising a predetermined set of drive speed settings for operating said driver member, each drive speed setting of said set of drive speed settings corresponding to a predetermined amount of said gypsum to be transferred to said irrigation ditch, said predetermined amount of gypsum being determined by a dynamic relationship of a particular speed setting for rotating said auger shaft, said diameter of said flights, and said pitch arrangement, said driver member comprises a shutoff means for stopping operation of said apparatus upon depleting said pile of gypsum;
said second control means comprising a wheel having a slip clutch and an associated tensioning means, said tensioning means being tensioned for disengaging said wheel from said first control means according to loading impediments encountered during transferring of said gypsum, and a terrain compensation means for providing smooth surface contact with said wheel and eliminating terrain related forward movement storpage, said terrain compensation means being suitably sized for arrangement about a fringe of said pile of gypsum;
said positioning step (d) comprises:
positioning said terrain compensation means about a fringe of said pile of gypsum; and said operating step (e) comprises:
adjusting the speed of said driver member to one of said speed settings corresponding to a predetermined amount of said gypsum to be transferred to said irrigation ditch,
urging said wheel forward toward said pile of gypsum,
responding to loading impediments, and
guiding said wheel on said terrain compensation means.

9. A method of transferring predetermined continuous amounts of granular and powdered gypsum as recited in claim 7, wherein:
said operating step (e) comprises:
controlling the speed of said driver member to one of said speed settings corresponding to predetermined amounts of said gypsum to be transferred to said irrigation ditch;
controlling granular load amount of said gypsum on said auger assembly;
controlling forward urging movement responsive to randomly encountered loading impediments.

* * * * *